Inventor
Alwin B. Newton
George H Fisher
Attorney

Patented Apr. 29, 1941

2,240,375

UNITED STATES PATENT OFFICE 2,240,375

REFRIGERATION CONTROL SYSTEM

Alwin B. Newton, Minneapolis, Minn., assignor to Minneapolis-Honeywell Regulator Company, Minneapolis, Minn., a corporation of Delaware Application February 24, 1939, Serial No. 258,229

12 Claims. (Cl. 62—4)

This invention relates to control systems for a refrigerating apparatus and particularly to a control system wherein the refrigerating apparatus is placed in operation only when the thermostatic control means calls for cooling, when the suction pressure rises to a predetermined high value which may be a defrosting value and when the head pressure decreases to a predetermined low value, and wherein the refrigerating apparatus is maintained in operation until either the thermostatic control means is satisfied or the suction pressure decreases to a predetermined low value or the head pressure increases to a predetermined high value. With such a control arrangement accurate temperature conditions are maintained, defrosting each cycle of operation is provided, starting of the compressor against high head pressure is prevented, and stopping of the compressor when the head pressure becomes too high or when the suction pressure becomes too low is provided.

When the above control system is applied to a multiple fixture refrigerating apparatus, the thermostatic control means usually includes a plurality of thermostats arranged in parallel, one thermostat for each fixture. By reason of the parallel arrangement any thermostat may start operation of the compressor and they all must be satisfied before they can stop the compressor. It is therefore seen that a situation may arise where there will be at least one thermostat calling for cooling at all times so that the compressor will remain in continuous operation with the result that defrosting of the evaporators will not be accomplished.

It is therefore an object of this invention to avoid the above difficulty by providing means for insuring a defrosting operation. In carrying out this feature of the invention a time operated means is utilized for stopping operation of the compressor whereupon it cannot be restarted until all of the evaporators have defrosted. A further object is to have the timing cycle initiated upon starting of the compressor and if the compressor is not stopped by the control system within the time cycle, then the timing means will stop the compressor at the end of the time cycle to cause defrosting. This will also tend to cause the thermostats to call for cooling and be satisfied together so that the control system will tend to operate in the normal manner. In this way defrosting of the evaporators is assured.

When the compressor of the above outlined control system is located in a relatively cold location, such as a basement or an outside shed, it may well happen that in the winter-time the ambient temperature around the compressor and/or the suction line will be so low that the suction pressure cannot rise to the predetermined high defrosting value and under these conditions the compressor could not be started. This may occur regardless of whether the system be a single or multiple fixture system.

It is therefore another object of this invention to avoid this difficulty by providing means for starting the operation of the compressor independently of the value of the suction pressure. In carrying out this feature of the invention a time operated means is utilized for starting operation of the compressor independently of the suction pressure and once the compressor has thus been operated, the heat from the compressor and motor will usually increase the ambient temperature sufficiently so that the system will then operate in the normal manner. A further object of this invention is to have the time operated means start the compressor independently of the suction pressure and the thermostatic control means to maintain the ambient temperature surrounding the compressor sufficiently high at all times. Still another object of this invention, as exemplified by a modification, is to have the time operated means start the compressor independently of suction pressure only when the thermostatic control means is calling for cooling. Still another object of this invention is to place the compressor in operation by the time operated means and to continue the compressor in operation independently of the time operated means as long as the suction pressure is above the predetermined low value and the control system is demanding operation of the compressor.

A further object of this invention is to provide a time operated means in conjunction with the above outlined control system for accomplishing both operations, namely, interrupting operation of the compressor to assure defrosting and starting operation of the compressor to avoid difficulties arising from a cold location of the compressor.

Still another object of this invention is to prevent starting of the compressor until the head pressure decreases to a predetermined low value regardless of whether the thermostatic control means or the time operated means demand starting of the compressor. In this manner starting of the compressor against high head pressures is at all times prevented.

Other objects and advantages will become apparent to those skilled in the art upon reference to the accompanying specification, claims, and drawings, in which:

Figure 1 is a diagrammatic illustration of one form of this invention as applied to a multiple fixture refrigerating apparatus, wherein the time operated means operates to stop operation of the refrigerating apparatus to assure defrosting and operates to start the refrigerating apparatus independently of suction pressure and the thermostatic control means to avoid difficulties arising from a cold location of the compressor.

Figure 1:
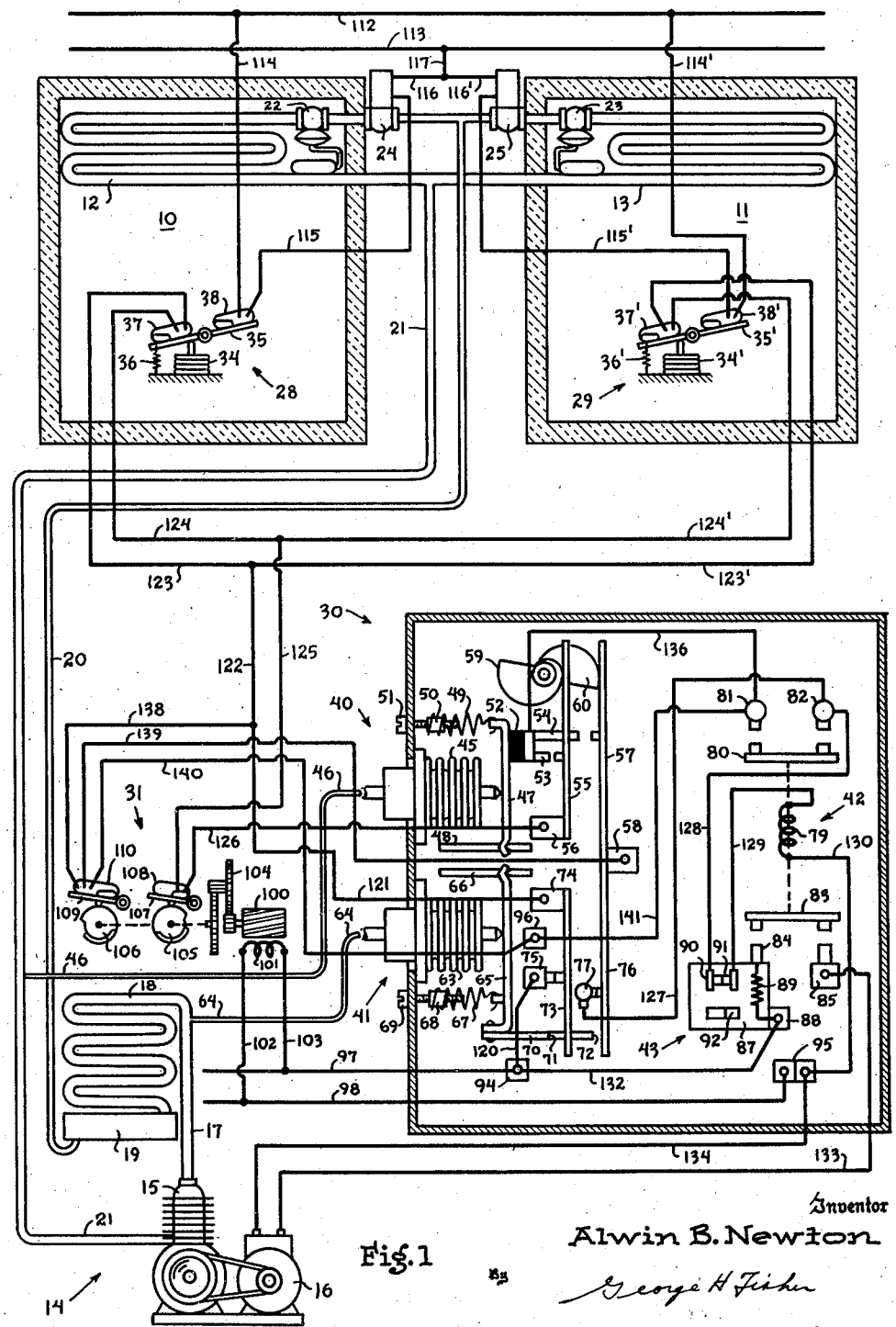

For a more thorough understanding of this invention reference is made to Figure 1 which illustrates two fixtures 10 and 11 to be cooled. The fixtures 10 and 11 may be spaces, walk-in boxes, soda fountains, storage compartments or any type of apparatus to be cooled. While only two fixtures are shown for purposes of illustration, any number may be utilized. The fixtures 10 and 11 are cooled by means of cooling coils in the form of evaporators 12 and 13, respectively. Refrigerant is circulated through the evaporators 12 and 13 by means of a refrigerating apparatus generally designated at 14 which may comprise a compressor 15 and an electric motor 16 for driving the same. Compressed refrigerant flows from the compressor 15 through a high pressure line 17 to a condenser 18 and condensed refrigerant is collected in a receiver 19. Liquid refrigerant flows from the receiver 19 through a liquid line 20 to the evaporators 12 and 13 which are shown to be arranged in parallel. Evaporated refrigerant is withdrawn from the evaporators 12 and 13 through a suction line 21 by the compressor 15. Expansion valves 22 and 23 which may take the form of thermostatic expansion valves control the supply of refrigerant to the evaporators 12 and 13, respectively, in a conventional manner. Solenoid valves 24 and 25 also control the supply of refrigerant to the evaporators 12 and 13, respectively, the arrangement being such that when the solenoid valves are energized refrigerant is allowed to flow to the evaporators 12 and 13 and when the solenoid valves are de-energized the supply of refrigerant to the evaporators 12 and 13 is shut off.

The solenoid valves 24 and 25 are controlled by thermostatic control means 28 and 29, respectively, responsive to the temperature within the fixtures 10 and 11. The thermostatic control means 28 and 29 also operate in conjunction with a unitary control arrangement generally designated at 30 for controlling the operation of the compressor motor 16. A time operated means generally designated at 31 also operates in conjunction with the unitary control arrangement 30 for controlling the operation of the compressor motor 16.

The thermostatic control means 28 may comprise a bellows 34 containing a volatile fluid for operating a lever 35 against the action of an adjustable tension spring 36. The lever 35 in turn operates mercury switches 37 and 38, the arrangement being such that when the temperature within the fixture 10 rises to 42°, illustratively, the switches 37 and 38 are closed and when the temperature decreases to 40°, illustratively, the mercury switches 37 and 38 are opened. The thermostatic control means 29 responsive to the temperature within the fixture 11 may be exactly the same as the thermostatic control means 28 of the fixture 10 and therefore like reference characters primed have been utilized for like parts.

The unitary control arrangement generally designated at 30 may be of the type shown and described in application Serial No. 196,447 filed by Albert L. Judson and Carl G. Kronmiller on March 17, 1938. For purposes of illustration in this application the unitary control arrangement is shown to comprise a control means generally designated at 40 responsive to variations in suction pressure, control means generally designated at 41 responsive to variations in head pressure, a relay or starter generally designated at 42, and an overload cutout mechanism generally designated at 43.

The suction pressure responsive control means may comprise a bellows 45 connected by a pipe 46 to the suction pressure line 21 for operating a lever 47 fulcrumed on a fulcrum member 48 against the action of an adjustable tension spring 49. One end of the tension spring 49 is connected to the lever 47 and the other end is secured to a nut 50 screw threadedly mounted on a screw 51. By rotating the screw 51 the pressure setting of this portion of the instrument may be adjusted at will. The lever 47 carries an insulating pad 52 upon which are mounted contacts 53 and 54, the contacts 53 and 54 being electrically connected together. The contact 53 is adapted to engage a contact member 55 carried by a terminal 56 and the contact 54 is adapted to engage a contact member 57 carried by a terminal 58. Concentrically located cams 59 and 60 are independently rotatable for independently adjusting the positions of the contact members 55 and 57 with respect to the contacts 53 and 54. For purposes of illustration it is assumed that upon an increase in suction pressure the contact 53 first engages the contact member 55 at 15 lbs. and then the contact 54 engages the contact member 57 at 32 lbs. which may be considered a defrosting value. Conversely, upon a decrease in suction pressure the contact 54 first disengages the contact member 57 at 32 lbs. and then the contact 53 disengages the contact member 55 at 15 lbs.

The head pressure responsive control means 41 may comprise a bellows 63 connected by a pipe 64 to the high pressure line 17 for operating a lever 65 fulcrumed on a fulcrum member 66 against the action of an adjustable tension spring 67. One end of the tension spring 67 is secured to the lever 65 and the other end is secured to a nut 68 screw threadedly mounted on a screw 69. By rotating the screw 69 the tension of the spring 67 is varied and hence the pressure setting of this portion of the instrument is adjusted at will. The lever 65 adjustably carries an abutment member 70 preferably made of insulating material and provided with abutments 71 and 72. The abutment 72 is adapted to engage a contact member 73 carried by a terminal 74 to move the contact member 73 out of engagement with a contact 75 and the abutment 72 is adapted to engage a contact member 76 carried by the terminal 58 for moving the contact member 76 out of engagement with a contact 77. For purposes of illustration it is assumed that upon an increase in suction pressure the contact member 76 is first moved out of engagement with the contact 77 at 140 lbs. and then the contact member 73 is moved out of engagement with the contact 75 at 180 lbs. Upon a decrease in head pressure the contact member 73 first engages the contact 75 at 180 lbs. and then the contact member 76 engages the contact 77 at 140 lbs.

The relay or starter 42 may comprise an operating coil 79 for moving a bridge member 80 into engagement with contacts 81 and 82 and for moving a bridge member 83 into engagement with contacts 84 and 85 when energized. When the operating coil 79 is deenergized the bridge members 80 and 83 are moved out of engagement with their respective contacts by means of springs, gravity or other means, not shown.

The overload cutout device 43 may comprise a casing 87 to which is secured a terminal 88. A heater element 89 is connected between the terminal 88 and the contact 84 and when the current flow through the heater element 89 becomes excessive due to an overload condition, a thermostatic element trips a latch, not shown, for separating control contacts 90 and 91. The control contacts 90 and 91 may be reclosed by means of a manual reset lever 92.

The unitary control arrangement 30 is also provided with power terminals 94 and 95 to which are connected line wires 97 and 98 leading from some source of power, not shown. The unitary control arrangement also includes a control terminal 96.

The time operated means 31 may comprise a rotor 100 influenced by a field winding 101 connected by wires 102 and 103 across the line wires 97 and 98. The rotor 100 is therefore maintained in continuous operation and operates through a reduction gear train 104 for operating adjustable cams 105 and 106. Cam 105 operates a lever 107 which in turn operates a mercury switch 108 and cam 106 operates a lever 109 which in turn operates a mercury switch 110. The mercury switch 108 is normally closed and the mercury switch 110 is normally open. For purposes of illustration it is assumed that the cams 105 and 106 make one complete revolution in an hour's time and that on the hour the switch 108 is moved to an open position for an interval of one minute and on the half-hour the switch 110 is moved to a closed position for an interval of one minute.

Power is supplied to the solenoid valves 24 and 25 from line wires 112 and 113 leading from some source of power, not shown. When the temperature within the fixture 10 rises to 42° the mercury switch 38 is closed to complete a circuit from the line wire 112 through wire 114, mercury switch 38, wire 115, solenoid valve 24 and wires 116 and 117 back to the other line wire 113. Completion of this circuit energizes the solenoid valve 24 to allow flow of refrigerant into the evaporator 12 and the solenoid valve 24 remains energized until the temperature within the fixture 10 decreases to 40° at which time the mercury switch 38 is opened. Solenoid valve 25 for the fixture 11 is controlled in exactly the same manner as the solenoid valve 24 of fixture 10 and like reference characters primed have been utilized for like wiring connections. In this manner the thermostatic control means 28 and 29 open and close their respective solenoid valves 24 and 25 in accordance with temperature conditions in their associated fixtures 10 and 11 to maintain desired temperature conditions within these fixtures.

Assume now that the temperature within the fixture 10 rises to 42° so that the mercury switch 37 is closed, that the suction pressure increases to 32 lbs. indicating that the evaporators 12 and 13 have defrosted to move the contacts 53 and 54 into engagement with the contact members 55 and 57, and that the head pressure has decreased to 140 lbs. to cause the contact members 73 and 76 to engage the contacts 75 and 77. A main starting circuit for the operating coil 79 of the relay or starter 42 is thereupon completed and this starting circuit may be traced from the line wire 97 through terminal 94, wire 120, contact 75, contact member 73, terminal 74, wires 121, 122 and 123, mercury switch 37, wires 124 and 125, normally closed mercury switch 108 of the time operated means 31, wire 126, terminal 56, contact member 55, contacts 53 and 54, contact members 57 and 76, contact 77, wire 127, contact 82, wire 128, control contacts 90 and 91, wire 129, operating coil 79, wire 130 and terminal 95 back to the other line wire 98. Completion of this circuit energizes the operating coil 79 to move the bridge members 80 and 83 into engagement with their respective contacts.

Movement of the bridge member 83 into engagement with the contacts 84 and 85 completes a load circuit from the line wire 97 through terminal 94, wire 132, terminal 88, heater element 89, contact 84, bridge member 83, contact 85, wire 133, compressor motor 16, wire 134, and terminal 95 back to the other line wire 98. Completion of this circuit causes operation of the compressor 15 and hence circulation of refrigerant through the evaporators 12 and 13.

Movement of the bridge member 80 into engagement with the contacts 81 and 82 of the relay or starter 42 completes a main maintaining circuit for the operating coil 79 which is independent of contact 54, contact members 57 and 76 and contact 77. This maintaining circuit may be traced from the line wire 97 through terminal 94, wire 120, contact 75, contact member 73, terminal 74, wires 121, 122 and 123, mercury switch 37, wires 124 and 125, normally closed switch 108, wire 126, terminal 56, contact member 55, contact 53, wire 136, contact 81, bridge member 80, contact 82, wire 128, control contacts 90 and 91, wire 129, operating coil 79, wire 130 and terminal 95 back to the other line wire 98. Completion of this circuit maintains the compressor in operation until such time as either the temperature within the fixture 10 decreases to 40° or the suction pressure decreases to 15 lbs. or the head pressure increases to 180 lbs. When any of these contingencies occur the compressor is stopped and cannot again be restarted until such time as the temperature within the fixture rises to 42°, the suction pressure increases to at least 32 lbs., and the head pressure is below 140 lbs.

In a like manner the temperature responsive control means 29 of the fixture 11 may control the operation of the compressor motor 16 and like reference characters primed for like wiring connections have been utilized. It is here noted that the mercury switches 37 and 37' are located in parallel so that either thermostatic control means 28 or 29 may place the compressor in operation and the compressor will be maintained in operation until such time as both thermostatic control means 28 and 29 are satisfied.

Summing up, the control system thus far described places the compressor in operation when either or both of the control means 28 and 29 call for cooling, when the suction pressure increases to 32 lbs. indicating that the evaporators 12 and 13 have defrosted, and when the head pressure is below 140 lbs. and continue the compressor in operation until either both of the thermostatic control means 28 and 29 are satisfied or the suction pressure decreases to 15 lbs. or the head pressure increases to 180 lbs.

By reason of the parallel arrangement of the thermostatic control means any thermostatic control means may start operation of the compressor and all must be satisfied before the compressor is stopped. It is therefore seen that a situation may arise where there will be at least one thermostatic control means calling for cooling at all times so that the compressor will remain in continuous operation with the result that defrosting of the evaporators will not be accomplished. This is particularly true where a large number of fixtures are cooled by a common compressor. It is here noted that the normally closed mercury switch 108 of the time operated control means 31 is included in series in both the main starting and main maintaining circuits outlined above and when this normally closed mercury switch 108 is opened for the one minute interval the relay or starter 42 is dropped out and the compressor is stopped. The compressor as pointed out above cannot again be restarted until such time as the evaporators 12 and 13 are defrosted. The normally closed mercury switch 108 of the time operated means 31 therefore operates to stop operation of the compressor at predetermined intervals to insure that the compressor will not remain in continuous operation whereby defrosting of the evaporators 12 and 13 is obtained at least every hour. By so interrupting operation of the compresor at intervals the thermostatic control means of the fixtures tend to call for cooling and be satisfied together so that the control system will tend to operate in the normal manner outlined above. In this way defrosting of the evaporator is at all times assured.

When the compressor of the above outlined control system is located in a relatively cold location, such as a basement or an outside shed, it may well happen that in the winter-time the ambient temperature surrounding the compressor will be so low that the suction pressure cannot rise to the predetermined value of 32 lbs. which is a requisite for the starting of the compressor and under these conditions the compressor could not be started. The normally opened switch 110 of the time operated means operates to start the compressor independently of the suction pressure responsive control means 40, this switch being closed for a period of one minute every hour.

Assume now that the ambient temperature surrounding the compressor is such that the suction presure can only rise to 25 lbs. whereupon the compressor cannot be placed in operation by the above outlined control system. When the mercury switch 110 is moved to a closed position an auxiliary starting circuit is completed from the line wire 97 through terminal 94, wire 120, contact 75, contact member 73, terminal 74, wires 121 and 138, mercury switch 110, wire 139, terminal 58, contact member 76, contact 77, wire 127, contact 82, wire 128, control contacts 90 and 91, wire 129, operating coil 79, wire 130, and terminal 95 back to the other line wire 98. Completion of this auxiliary starting circuit pulls in the relay or starter 42 to place the compressor in operation and pulling in of the starter also completes an auxiliary maintaining circuit which may be traced from the line wire 97 through terminal 94, wire 120, contact 75, contact member 73, terminal 74, wires 121 and 138, mercury switch 110, wire 140, control terminal 96, wire 141, contact 81, bridge member 80, contact 82, wire 128, control contacts 90 and 91, wire 129, operating coil 79, wire 130, and terminal 95 back to the other line wire 98. Completion of this auxiliary maintaining circuit maintains the operating coil energized as long as the mercury switch 110 is closed and effectively prevents short-cycling of the compressor motor 16.

If as assumed above the suction pressure could only rise to 25 lbs., the contact 53 and the contact member 55 would be closed and if any of the thermostatic control means 28 and 29 were calling for cooling the relay or starter 42 would be maintained pulled in by the above outlined main maintaining circuit. Hence the compressor would remain in operation until either the thermostatic control means 28 and 29 become satisfied or the suction pressure decreases to 15 lbs. or the head pressure increases to 180 lbs. By this time the compressor and the compressor motor would most likely heat the air surrounding the compressor so that the suction pressure could rise to the cut-in value of 32 lbs. Thereafter the compressor would operate in the normal manner outlined above.

Accordingly, in Figure 1 in addition to the control sequence performed by the normal control system the time operated means 31 operates to interrupt operation of the compressor at definite intervals to assure that defrosting of the evaporators will occur and operates to start the compressor at intervals to avoid difficulties arising from the location of the compressor in a cold place.

Figure 2:
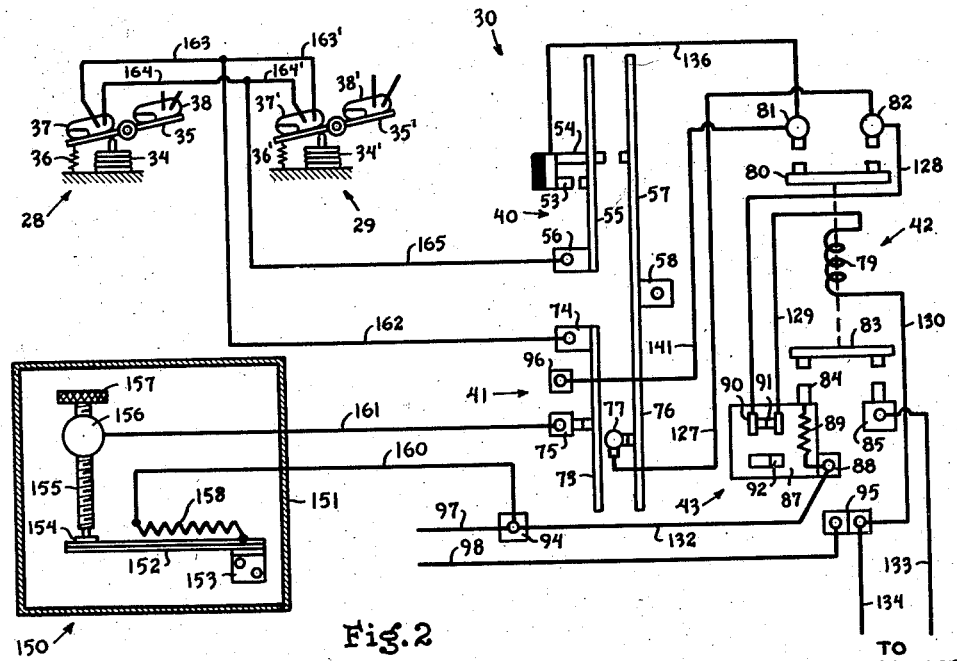
Figure 2 is a diagrammatic illustration of a modified form of this invention wherein a recycling time operated means operates to stop operation of the compressor a predetermined time after the compressor has been placed in operation.

Figure 2 shows substantially the same control system as is illustrated in Figure 1 and like reference characters for like parts have been utilized in Figure 2. The main difference between the structure of Figure 2 and that of Figure 1 is that a different time operated means is utilized for interrupting operation of the compressor to assure defrosting. The time operated means of Figure 2 is generally designated at 150 and may comprise a casing 151 which may be made of heat insulating material. A thermostatic element 152 is secured to a bracket 153 carried by the casing 151 and carries a contact 154 which is adapted to engage an adjustable stationary contact 155. The adjustable stationary contact 155 is screw threadedly mounted in a post 156 and is provided with a knob 157 for adjusting the position of the same. A heater element 158 located adjacent the bimetallic element 152 is utilized for heating the bimetallic element 152 to warp the same downwardly to move the contact 154 out of engagement with the stationary contact 155. One end of the heater element 158 is connected to the bimetallic element 152 and the other end is connected by a wire 160 to the power terminal 94. The post 156 is connected by a wire 161 to the contact 75.

Assume now that the temperature within the fixture 10 increases to 42° to cause the mercury switch 37 to close, that the suction pressure increases to 32 lbs., and that the head pressure decreases to 140 lbs., a main starting circuit is thereupon completed from the line wire 97 through terminal 94, wire 160, heater element 158, bimetallic element 152, contacts 154 and 155, post 156, wire 161, contact 75, contact member 73, wires 162 and 163, mercury switch 37, wires 164 and 165, terminal 56, and so on through the various contacts to complete the above outlined main starting circuit. Completion of this main starting circuit pulls in the relay or starter 42 to operate the compressor and to complete a main maintaining circuit which may be traced from the line wire 97 through terminal 94, wire 160, heater 158, bimetallic element 152, contacts 154 and 155, post 156, wire 161, contact 75, contact member 73, terminal 74, wires 162 and 163, switch 37, wires 164 and 165, terminal 56 and so on through the various contacts of the unitary control arrangement. The compressor therefore remains in operation until either both of the thermostatic control means 28 and 29 are satisfied or until the suction pressure decreases to 15 lbs. or until the head pressure increases to 180 lbs. When any of these contingencies occur the compressor is shut down and cannot again be restarted until the evaporators have defrosted to allow the suction pressure to rise to 32 lbs.

When the compressor is placed in operation in the manner outlined above the heater element 158 is energized since this heater element is included in both the main starting and main maintaining circuits for the relay or starter 42. This heater element 158 then tends to heat the bimetallic element 152 to flex the same downwardly and after a time interval depending upon the adjustment of the contact 155, the contacts 154 and 155 are separated to break the above main starting and main maintaining circuits to drop out the relay or starter 42 and hence stop operation of the compressor. For purposes of illustration, it is assumed that it takes substantially one hour for the heater 158 to heat the bimetallic element 152 sufficiently to separate the contact 154 from the contact 155. By reason of the control arrangement of Figure 2, if the normal operation of the refrigerating apparatus fails to stop the compressor within a predetermined time interval as determined by the time operated means 150, the time operated means will stop operation of the compressor at the termination of this time interval whereupon defrosting of the evaporators is assured. In other words, the time operated means 150 of Figure 2 limits the length of the "on" periods of the compressor so that defrosting of the evaporators must occur after the compressor has run a predetermined length of time. Accordingly, the operation of Figure 2 differs from that of Figure 1 in that in Figure 2 the timing cycle begins as soon as the compressor is placed in operation while in Figure 1 the times at which the time operated means 31 stops operation of the compressor occur periodically without regard to the starting of the compressor.

Figure 3:
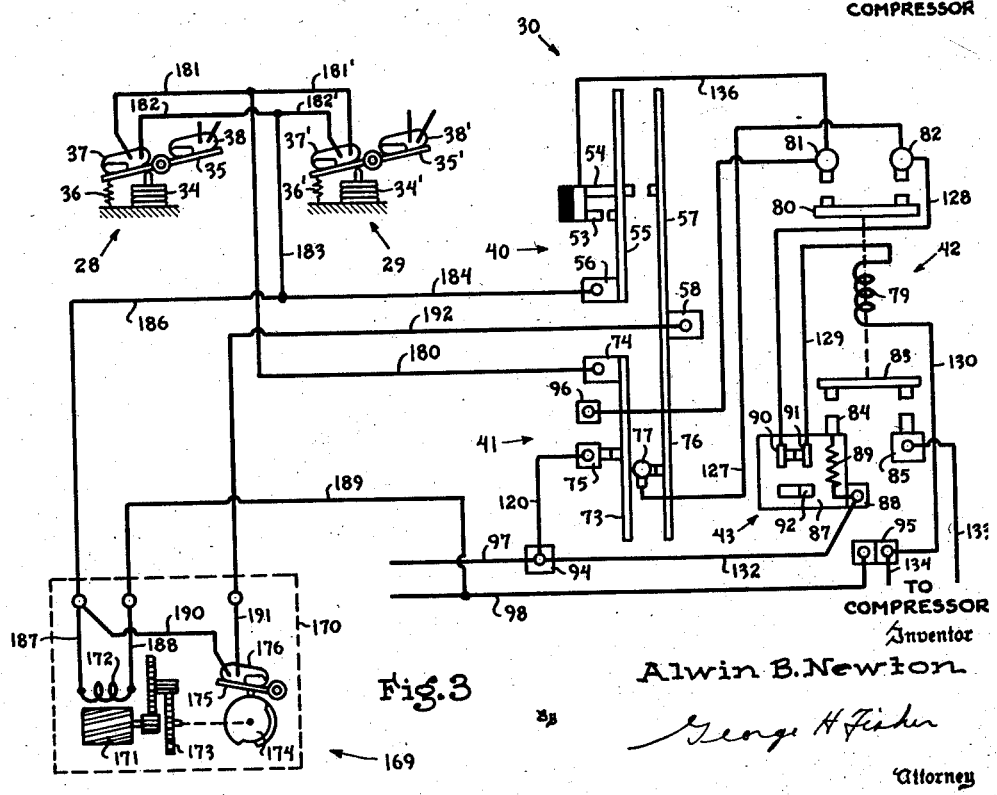
Figure 3 is a diagrammatic illustration of another form of this invention wherein the time operated means operates to start operation of the compressor independently of the suction pressure only when the thermostatic control means is calling for cooling.

Figure 3 discloses a control arrangement which is substantially the same as that of Figure 1 with the exception that a different time operated means is utilized for starting operation of the compressor independently of the suction pressure responsive control means. Like parts in Figures 1 and 3 have been designated by like reference characters. The time operated means of Figure 3 is generally designated at 169 and may comprise a casing 170 in which is mounted a rotor 171 influenced by a field winding 172. The rotor 171 operates through a reduction gear train 173 an adjustable cam 174 which in turn operates a lever 175. The lever 175 operates a mercury switch 176 which is normally open, the switch being closed for an interval say of one minute every hour.

Assume now that the temperature within the fixture 10 rises to 42°, that the suction pressure rises to 32 lbs. and that the head pressure decreases to 140 lbs. When this occurs a main starting circuit is completed from the line wire 97 through terminal 94, wire 120, contact 75, contact member 73, terminal 74, wires 180 and 181, mercury switch 37, wires 182, 183 and 184, terminal 56 and through the various contacts and contact members to pull in the relay or starter 42. Pulling in of the relay or starter 42 operates the compressor and completes a main maintaining circuit in the manner pointed out above. Accordingly, in Figure 3 the compressor is placed in operation when either of the thermostatic control means call for cooling, the suction pressure rises to 32 lbs. and the head pressure decreases to 140 lbs. and is continued in operation until either all of the thermostatic control means are satisfied, or the suction pressure decreases to 15 lbs. or the head pressure increases to 180 lbs. Thus far Figure 3 operates in exactly the same manner as Figures 1 and 2.

Assume now that the temperature within the fixture 10 increases to 42°, that the head pressure decreases to 140 lbs. and that the ambient temperature surrounding the compressor is such that the suction pressure cannot rise to the starting value of 32 lbs. but can only rise to say 25 lbs. Under these conditions a circuit is completed from the line wire 97 through terminal 94, wire 120, contact 75, contact member 73, terminal 74, wires 180 and 181, mercury switch 37, wires 182, 183, 186 and 187, field winding 172 of the time operated device 169, and wires 188 and 189 back to the line wire 98. Completion of this circuit operates the time operated means 169 and when the time operated means has operated sufficiently far to close the normally opened switch 176, an auxiliary starting circuit is completed from the line wire 97 through wire 120, contact 75, contact member 73, terminal 74, wires 180 and 181, mercury switch 37, wires 182, 183, 186 and 190, mercury switch 176, wires 191 and 192, terminal 58, contact member 76, contact 77, wire 127, contact 82, wire 128, control contacts 90 and 91, wire 129, operating coil 79, wire 130 and terminal 95 back to the other line wire 98. Completion of this auxiliary starting circuit pulls in the relay or starter 42 to operate the compressor 16. Pulling in of the relay or starter 42 also completes the main maintaining circuit which is independent of the time operated means 169 since the suction pressure at this time is assumed to be 25 lbs. Therefore the compressor is maintained in operation until the thermostatic control means are satisfied or the suction pressure decreases to 15 lbs. or the head pressure decreases to 180 lbs. This operation of the compressor will raise the temperature of the air surrounding the compressor so that thereafter the compressor will operate in the normal manner outlined above. It is here noted that the switches 37 of the thermostatic control means are located in series with the normally open switch 176 of the time operated means 169 so that the time operated means can place the compressor in operation only when one of the thermostatic control means is calling for cooling. In this respect the sequence of operation performed by the structure of Figure 3 is different from that of Figure 1.

From the above it is seen that I have provided a time operated means operating in conjunction with a defrosting control system for accomplishing two improved modes of operation, namely, interrupting operation of the compressor to assure defrosting, and starting operation of the compressor independently of suction pressure to avoid difficulties arising from a cold location of the compressor. Although for purposes of illustration various temperature and pressure values have been set forth, it is obvious that other values may be utilized within the confines of this invention. While several forms of this invention have been disclosed, other forms thereof may become apparent to those skilled in the art upon reference to this disclosure and therefore this invention is to be limited only by the scope of the appended claims and prior art.

I claim as my invention:

1. In a control system for a multiple fixture refrigerating apparatus including an evaporator for each fixture for cooling the same and a compressor for circulating refrigerant through the evaporators, the combination of, a valve for each evaporator for controlling the circulation of refrigerant therethrough, a thermostat in each fixture for operating its associated valve upon a call for cooling to allow circulation of refrigerant through the evaporator of that fixture, a pair of sequentially operated switches, means responsive to an increase in suction pressure for sequentially closing said switches, a normally closed switch, a starter for the compressor including an operating coil and a maintaining switch which is closed upon energization of the operating coil, means for completing a starting circuit for the operating coil through the thermostats in parallel, the sequentially operated switches in series and the normally closed switch to energize the starter and start the compressor when any thermostat calls for cooling providing the suction pressure has risen to a predetermined high defrosting value, means for completing a maintaining circuit for the operating coil through the thermostats in parallel, the first to close of the sequentially operated switches, the normally closed switch and the maintaining switch to maintain the starter energized and the compressor in operation until all of the thermostats are satisfied or the suction pressure decreases to a predetermined low value, and timing means placed in operation for opening the normally closed switch to deenergize the operating coil and stop the compressor whereby defrosting of the evaporators of all of the fixtures is assured.

2. In a control system for a multiple fixture refrigerating apparatus including an evaporator for each fixture for cooling the same and a compressor for circulating refrigerant through the evaporators, the combination of, a valve for each evaporator for controlling the circulation of refrigerant therethrough, a thermostat in each fixture for operating its associated valve upon a call for cooling to allow circulation of refrigerant through the evaporator of that fixture, a pair of sequentially operated switches, means responsive to an increase in suction pressure for sequentially closing said switches, a normally closed switch, a starter for the compressor including an operating coil and a maintaining switch which is closed upon energization of the operating coil, means for completing a starting circuit for the operating coil through the thermostats in parallel, the sequentially operated switches in series and the normally closed switch to energize the starter and start the compressor when any thermostat calls for cooling providing the suction pressure has risen to a predetermined high defrosting value, means for completing a maintaining circuit for the operating coil through the thermostats in parallel, the first to close of the sequentially operated switches, the normally closed switch and the maintaining switch to maintain the starter energized and the compressor in operation until all of the thermostats are satisfied or the suction pressure decreases to a predetermined low value, and timing means placed in operation upon energization of said starter for opening said normally closed switch a predetermined time thereafter for deenergizing said starter to stop operation of the compressor whereby defrosting of the evaporators of all of the fixtures is assured.

3. In a control system for a multiple fixture refrigerating apparatus including an evaporator for each fixture for cooling the same and a compressor for circulating refrigerant through the evaporators, the combination of, thermostatic means responsive to the temperature of each fixture, control means responsive to variations in suction pressure, means controlled by the thermostatic means and the control means to start the compressor only when any of the thermostatic means calls for cooling and the suction pressure has increased to a defrosting value and timing means placed in operation upon starting of the compressor for stopping operation of the compressor a predetermined time thereafter whereby defrosting of the evaporators of all of the fixtures is assured.

4. In a control for a multiple fixture refrigerating apparatus including an evaporator for each fixture for cooling the same and a compressor for circulating refrigerant through the evaporators, the combination of, thermostatic means responsive to the temperature of each fixture, valve means associated with each fixture and controlled by its associated thermostatic means to allow circulation of refrigerant through the evaporator of that fixture upon a call for cooling, control means responsive to variations in suction pressure, means controlled by the thermostatic means and the control means to start the compressor only when any of these thermostatic means calls for cooling and the suction pressure has increased to a defrosting value and timing means placed in operation upon starting of the compressor for stopping operation of the compressor a predetermined time thereafter whereby defrosting of the evaporators of all of the fixtures is assured.

5. In a control system for a refrigerating apparatus having evaporator means for controlling the temperature condition of a medium and a compressor for circulating refrigerant through the evaporator means, the combination of, thermostatic means responsive to changes in the temperature condition of the medium being controlled by the evaporator means, means responsive to changes in suction pressure, control means controlled by the thermostatic means and the suction pressure responsive means for starting operation of the compressor upon a call for cooling by the thermostatic means provided the suction pressure has risen to a predetermined high value, and time operated means for controlling said control means to start operation of the compressor independently of the suction pressure responsive means whereby the compressor may be started even though the suction pressure has not risen to the predetermined value.

6. In a control means for a refrigerating apparatus having evaporator means for controlling the temperature condition of a medium and a compressor for circulating refrigerant through the evaporator means, the combination of, thermostatic means responsive to changes in the temperature condition of the medium being controlled by the evaporator means, means responsive to changes in suction pressure, control means controlled by the thermostatic means and the suction pressure responsive means for starting operation of the compressor upon a call for cooling by the thermostatic means provided the suction pressure has risen to a predetermined high value, and time operated means for controlling said control means to start operation of the compressor at definite intervals independently of the thermostatic means and the suction pressure responsive means to increase the ambient temperature of the medium surrounding the compressor whereby the suction pressure is increased to a value which allows starting of the compressor by the suction pressure responsive means and the thermostatic means.

7. In a control system for a refrigerating apparatus having evaporator means for controlling the temperature condition of a medium and a compressor for circulating refrigerant through the evaporator means, the combination of, thermostatic means responsive to changes in the temperature condition of the medium being controlled by the evaporator means, means responsive to changes in suction pressure, control means controlled by the thermostatic means and the suction pressure responsive means for starting operation of the compressor upon a call for cooling by the thermostatic means provided the suction pressure has risen to a predetermined high value and to continue the compressor in operation until either the thermostatic means is satisfied or the suction pressure decreases to a predetermined low value, and time operated means for controlling said control means to start operation of the compressor independently of the suction pressure responsive means whereby the compressor may be started even though the suction pressure has not risen to the predetermined value.

8. In a control system for a refrigerating apparatus having evaporator means for controlling the temperature condition of a medium and a compressor for circulating refrigerant through the evaporator means, the combination of, thermostatic means responsive to changes in the temperature condition of the medium being controlled by the evaporator means, means responsive to changes in suction pressure, control means controlled by the thermostatic means and the suction pressure responsive means for starting operation of the compressor upon a call for cooling by the thermostatic means provided the suction pressure has risen to a predetermined high value and to continue the compressor in operation until either the thermostatic means is satisfied or the suction pressure decreases to a predetermined low value, and time operated means for controlling said control means to start operation of the compressor at definite intervals independently of the thermostatic means and the suction pressure responsive means to increase the ambient temperature of the medium surrounding the compressor whereby the suction pressure is increased to a value which allows starting of the compressor by the suction pressure responsive means and the thermostatic means.

9. In a control system for a multiple fixture refrigerating apparatus including an evaporator for each fixture for cooling the same and a compressor for circulating refrigerant through the evaporators, the combination of, thermostatic means responsive to the temperature of each fixture, control means responsive to variations in suction pressure, means controlled by the thermostatic means and the control means to start the compressor when any of the thermostatic means calls for cooling and the suction pressure has increased to a defrosting value and to continue the compressor in operation until all of the thermostatic means are satisfied, time operated means for stopping operation of the compressor whereby defrosting of all of the evaporators is assured, and time operated means for starting operation of the compressor independently of the suction pressure responsive control means whereby the compressor may be started even though the suction pressure has not risen to the predetermined value.

10. In a control system for a multiple fixture refrigerating apparatus including an evaporator for each fixture for cooling the same and a compressor for circulating refrigerant through the evaporators, the combination of, thermostatic means responsive to the temperature of each fixture, control means responsive to variations in suction pressure, means controlled by the thermostatic means and the control means to start the compressor when any of the thermostatic means calls for cooling and the suction pressure has increased to a defrosting value and to continue the compressor in operation until all of the thermostatic means are satisfied, time operated means for stopping operation of the compressor at definite intervals whereby defrosting of all of the evaporators is assured, and time operated means for starting operation of the compressor at definite intervals independently of the thermostatic means and the suction pressure responsive means to increase the ambient temperature surrounding the compressor whereby the suction pressure is increased to a value which allows starting of the compressor by the suction pressure responsive means and the thermostatic means.

11. In a control system for a muliple fixture refrigerating apparatus including an evaporator for each fixture for cooling the same and a compressor for circulating refrigerant through the evaporators, the combination of, thermostatic means responsive to the temperature of each fixture, control means responsive to variations in suction pressure, control means responsive to variations in head pressure, means controlled by the thermostatic means and the control means to start the compressor only when any of the thermostatic means calls for cooling, the suction pressure increases to a defrosting value and the head pressure decreases to a predetermined low value and to continue the compressor in operation until either all of the thermostatic means are satisfied or the suction pressure decreases to a predetermined low value or the head pressure increases to a predetermined high value, and timing means placed in operation upon starting of the compressor for stopping operation of the compressor a predetermined time thereafter whereby defrosting of the evaporators of all of the fixtures is assured.

12. In a control system for a refrigerating apparatus having evaporator means for controlling the temperature condition of a medium and a compressor for circulating refrigerant through the evaporator means, the combination of, thermostatic means responsive to changes in the temperature condition of the medium being controlled by the evaporator means, means responsive to changes in suction pressure, means responsive to changes in head pressure, control means controlled by the thermostatic means, the suction pressure responsive means and the head pressure responsive means to start operation of the compressor only when the thermostatic means calls for cooling, the suction pressure increases to a predetermined high value and the head pressure decreases to a predetermined low value and to continue the compressor in operation until either the thermostatic means is satisfied or the suction pressure decreases to a predetermined low value or the head pressure increases to a predetermined high value, and time operated means for controlling said control means to start operation of the compressor independently of the suction pressure responsive means whereby the compressor may be started even though the suction pressure has not risen to the predetermined value.

ALWIN B. NEWTON.